2,789,939

PRODUCTION OF GLUTAMIC ACID BY CEPHALOSPORIUM

Donald A. Kita, Jackson Heights, N. Y., assignor to Chas. Pfizer & Co., Inc., Brooklyn, N. Y., a corporation of Delaware No Drawing. Application October 28, 1954, Serial No. 465,447

2 Claims. (Cl. 195—36)

This invention is concerned with a method for the production of L+ glutamic acid (d-glutamic acid) by fermentation.

Various methods of making glutamic acid have been known in the past. For example, the compound may be made by the hydrogenation of α-ketoglutaric acid in the presence of ammonia. However, this process has the disadvantage of producting a racemic compound when it is often desired to have the optically-active, naturally-occurring form. Glutamic acid has also been prepared by fermentation reactions which employ α-ketoglutaric acid as a starting material. The process of this present invention, however, avoids the need for employing α-ketoglutaric acid, a fairly expensive chemical. The process of this invention, therefore, has the advantage of being more economical than previous processes. The glutamic acid product is of definite value as a flavoring agent or flavor enhancer in a variety of food products, particularly meats or meat-derived products.

It has now been found that by employing certain fungi which are strains selected from the genus Cephalosporium, it is possible to produce glutamic acid in good yields. These organisms are grown on nutrient media under aerobic conditions. It has been found that the use of urea in the medium results in the production of particularly good yields of glutamic acid. However, this compound is not essential, since other nitrogen-containing substances are more or less effective. Otherwise, no special nutrient medium need be employed. The organism is provided with a source of carbohydrates, e. g. sucrose, glucose, corn syrup, or molasses. Other carbohydrate sources, such as starches of various kinds, e. g. potato, corn, wheat and other types may also be used. A variety of crude sources of growth substances, such as distiller's solubles, cornsteep liquor, and protein hydrolyzates of various types are also useful. It is, however, not necessary that any protein be present in the nutrient medium, although the addition of protein to the medium often results in increased yield. In some cases, it is advisable to add salts, such as sodium chloride, magnesium sulfate, potassium sulfate and sources of trace metals. This is particularly true when crude materials containing appreciable amounts of salts are not utilized in the fermentation medium. The one constituent which is always present is urea, if maximum yields of glutamic acid are to be obtained.

The urea sometimes may be added to the original culture medium or, alternatively, with some organisms it is preferred that after growth has been established on the nutrient medium, the urea then be added. It is advisable to use a concentration of urea of the order of about $\frac{1}{10}$ to 5% by weight in the reaction medium, although these limits should not be thought of as critical. Urea concentrations of 0.5% have been used very successfully.

It is important to note that urea may be used as the only source of nitrogen. It may, of course, also be used in conjunction with other simple nitrogen compounds such as nitrates or ammonium salts, or in conjunction with protein. As mentioned above, in some cases the yield is increased when protein is added to the nutrient medium, but urea must always be present for a good yield. The truly unexpected and unprecedented advantage of this invention lies in the fact that the organisms employed do not require that α-ketoglutaric acid be added to the medium as a precursor of the desired amino acid.

As noted above, organisms of the genus Cephalosporium, which is of the order Moniliales, of the class Fungi Imperfecti, are most effective in bringing about the formation of glutamic acid in submerged aerobic fermentations. Of special value are organisms of certain species of this genus, namely, *Cephalosporium salmosynnematum* (for instance the strain obtainable from the Michigan Board of Health as culture Number MBH 3590A–51 or from the Northern Regional Research Laboratory under #NRRL 2271), *Cephalosporium diospyri* (e. g. ATCC #9066 from the American Type Culture Collection), and *Cephalosporium acremonium* (e. g. ATCC #10,141 or the strain obtainable from the U. S. Quartermaster Corps as #QM 611). Various other strains of unidentified Cephalosporium species also are of value. These organisms are available in various public culture collections and may be isolated from samples of soil and other natural materials by well known techniques. The organisms may then be classified from descriptions given for various Cephalosporium species in the scientific literature.

The organisms may be maintained on slants of nutrient laboratory type media, such as Emerson's agar. The growth may be removed from the surface of such media and placed in sterile liquid nutrient media in small glass flasks for the cultivation of inoculum or for the operation of the present process on a small scale. These flasks may be stoppered with sterile cotton and shaken at a suitable temperature for a period of from one to five days. The cultivated organism may then be utilized for the inoculation of larger flasks or for glass or metal vessels of suitable design containing larger quantities of nutrient medium. In turn, after growth has been established in such equipment, the growth may be utilized for the inoculation of large scale fermentation vessels. In general, at least about 5% by volume of inoculum is used in starting the fermentation. With certain organisms, a higher proportion may be found advisable in order to obtain a rapid fermentation with economic production of glutamic acid. In some cases it has been found advisable to cultivate the organism for a certain length of time before the addition of urea, if this material is to be employed in the fermentation medium. This cultivation may take from ten to thirty hours and, when a rapidly growing, heavy culture is obtained, urea is added and there is a rapid formation of glutamic acid under these conditions. All of these operations should, of course, be conducted under sterile conditions so that the glutamic acid-producing organism is not contaminated with species which may be deleterious.

In general, the present fermentation process may be operated in media having an initial pH of from about 4.0 to about 8.0. Somewhat higher or lower pHs may be utilized, although there is no specific advantage thereto. When urea is added to the fermentation mixture, either initially or after some growth, there is a tendency for the pH to rise. Often a value of 8.5 is reached, but the pH seldom rises appreciably above this. This pH does not interfere in any way with the production of the desired glutamic acid product.

The progress of the process of the present invention may be followed most readily by removing from the reaction mixture at periodic intervals samples of the mixture which are then analyzed for glutamic acid content.

One convenient method for effecting such an analysis is to apply a sample of the product to a strip of filter paper utilizing the paper chromatography technique. A solvent system which has proven particularly effective is a mixture of one volume of glacial acetic acid, five volumes of butanol and five volumes of water. After development of the chromatogram, it is dried and sprayed with a dilute ninhydrin solution. Upon heating the paper strip, the presence of glutamic acid may be determined. By utilization of standard samples of glutamic acid of known concentration, it is possible to estimate with some degree of accuracy the proportion of glutamic acid produced in the fermentation. In general, yields of from about one and one-half to about two grams per liter of medium may be obtained.

In general the present process is operated at a temperature of from about 25° C. to about 32° C. Some formation of glutamic acid is often obtained in a period as short as twelve hours. However, the optimum time is somewhat more than this and, in general, not more than seventy hours is required for maximum production. The process may be operated in glass vessels or, for large scale operation, it may be prepared in metal vessels which are suitably equipped with agitating and aerating devices and so constructed that the vessels may be sterilized before the fermentation is commenced. The auxiliary equipment for sterilization of the medium or provisions for sterilization of the medium in the fermentation vessel are also essential. Aeration is generally conducted at a rate of one-half to two and one-half volumes of air per volume of medium per minute. The air must, of course, be carefully sterilized before use.

Various procedures may be used for isolation of the glutamic acid during the process of the present invention. One method which has been found useful is to filter the fermentation broth and pass the broth through a column of acid-washed alumina. The glutamic acid is adsorbed thereon and the residual material passes out of the column. The adsorbate may be washed with a small volume of water and the amino acid is then eluted in purified condition from the column with a dilute solution of a mineral acid, preferably hydrochloric acid. The pH of the eluate is then adjusted with an alkali, such as sodium hydroxide, to approximately 3.2. The mixture is thereupon concentrated to a small volume. During the concentration, salts tend to separate; that is, if hydrochloric acid has been used for elution of the column and sodium hydroxide has been used for adjusting the pH to 3.2, sodium chloride will tend to separate during the concentration. The salt is filtered and, on further concentration, crystalline glutamic acid separates from the solution. This product may be filtered and dried. Various other procedures may be utilized for recovering the amino acid. For instance, it may be recovered by extraction with a polar solvent, such as butanol, at the isoelectric point of the amino acid, that is, at about 3.2.

The following examples are given by way of illustration and are not intended as a limitation on the scope of this invention. In fact, as many widely varying embodiments are possible without departing from the spirit and scope of the herein described invention, it is to be understood that this invention is only limited by the specific wording of the appended claims.

*Example I*

A fermentation medium was prepared containing 4% by weight of distiller's solubles and 0.2% by weight of cornsteep liquor. The medium was adjusted to pH 7 with potassium hydroxide. After sterilization, it was inoculated with the strain of *Cephalosporium acremonium* ATCC 10,141. The mixture was stirred and aerated at 28° C. for twenty-four hours. At that time, 0.5% of urea was added to the mixture under sterile conditions. The fermentation was continued for another thirty hours. The mixture was then filtered and the filtered solution was passed through a column of acid-washed alumina. The product was eluted from the alumina with 1-N-hydrochloric acid. The hydrochloric acid solution was adjusted to pH 3.2 with 20% sodium hydroxide solution. The solution thus obtained was concentrated under vacuum. During concentration, sodium chloride crystallized out of the solution and was filtered. Upon further concentration, glutamic acid crystallized and this material was recovered. Approximately two grams of glutamic acid was recovered per liter of filtered fermentation broth.

*Example II*

The process described in Example I was repeated utilizing the strain of *Cephalosporium salmosynnematum* NRRL 2271. Comparable results were obtained; that is, glutamic acid was produced in a concentration of about 1.5 grams per liter of medium.

*Example III*

The process described in Example I was repeated utilizing the strain of *Cephalosporium diospyri* ATCC 9066. The glutamic acid that was produced was isolated and purified. Approximately one gram of glutamic acid was produced per liter of medium.

*Example IV*

The process described in Example I was repeated utilizing the same organism and a medium containing 4% by weight of wheat gluten in place of distiller's solubles. The pH of the mixture was about 5.0. The fermentation mixture that was produced was found to contain three grams of glutamic acid per liter.

*Example V*

The process described in Example I was repeated utilizing 4% by weight of corn gluten meal in place of the distiller's solubles and 0.2% by weight of cornsteep liquor. After twenty-four hours, 0.5% by weight of urea was added to the mixture. The pH rose shortly thereafter to about 8.0. At the completion of the fermentation, the solution was found to contain approximately three grams of glutamic acid per liter.

*Example VI*

The process described in Example I was repeated utilizing 4% by weight of soybean meal and 0.2% by weight of cornsteep liquor. The pH of the mixture was 5.0. After twenty-four hours, 0.5% by weight of urea was added and the fermentation was continued. A concentration of three and one-half grams of glutamic acid per liter was obtained.

What is claimed is:

1. A process for the production of glutamic acid which comprises cultivating a strain of a species of Cephalosporium in a nutrient medium having a pH from about 4.0 to about 8.5 and containing urea and a source of carbohydrate, under aerobic conditions until appreciable quantities of glutamic acid are formed in the medium.

2. A process as claimed in claim 1 wherein the Cephalosporium strain is chosen from the group of species consisting of *Cephalosporium salmosynnematum*, *Cephalosporium diospyri*, and *Cephalosporium acremonium*.

References Cited in the file of this patent

Cardinal: Jour. Biochem. Soc., 172, Jan.–Feb. 1948, pp. 609–612.

Jour. Biol. Chem., vol. 187, 1951: Cammarata et al., pp. 439–451; Feldman et al., pp. 821–830.

Crawford et al.: Jour. Gen. Microbiol., 1952, vol. 6, pp. 47–59.